United States Patent [19]

Gardner

[11] 4,332,606
[45] Jun. 1, 1982

[54] WARE IDENTIFYING APPARATUS FOR GLASSWARE MACHINES AND THE LIKE

[75] Inventor: Edward B. Gardner, Bloomfield, Conn.

[73] Assignee: Emhart Industries, Inc., Farmington, Conn.

[21] Appl. No.: 200,939

[22] Filed: Oct. 27, 1980

[51] Int. Cl.³ .............................................. C03B 9/40
[52] U.S. Cl. ...................................... 65/158; 65/29; 65/160; 65/DIG. 13; 364/473
[58] Field of Search ........... 65/29, 158, 160, DIG. 13; 364/473, 476

[56] References Cited

U.S. PATENT DOCUMENTS

| | | | |
|---|---|---|---|
| 3,762,907 | 10/1973 | Quinn et al. | 65/DIG. 13 |
| 3,767,374 | 10/1973 | Iacovazzi et al. | 65/165 |
| 3,894,232 | 7/1975 | Laspesa | 250/231 |
| 3,957,477 | 5/1976 | Jones et al. | 65/158 |
| 4,004,904 | 1/1977 | Fergusson | 65/158 |
| 4,092,533 | 5/1978 | Ohsako et al. | 250/231 |

OTHER PUBLICATIONS

Inex Automatic Inspection Process Control—Hot Bottle Ejector Series 82, Sep. 1978.

*Primary Examiner*—Arthur D. Kellogg
*Attorney, Agent, or Firm*—McCormick, Paulding & Huber

[57] ABSTRACT

A swab reject apparatus identifies and rejects articles that are made in a particular section and mold of a multi-gob, individual section (IS) glassware machine during a particular cycle of operation. The apparatus includes a manually actuated mold switch for each mold of the machine and a pulse generator that generates pulses corresponding to all of the articles made by the machine. Controls responding to the pulse generator and the manually actuated mold switches identify those articles while the articles are moving in series along an output conveyor. Once identified, the article or articles produced during the machine cycles immediately following swabbing are removed from the series on the conveyor.

32 Claims, 11 Drawing Figures

WARE IDENTIFYING APPARATUS FOR GLASSWARE MACHINES AND THE LIKE

BACKGROUND OF THE INVENTION

The present invention relates to apparatus for identifying articles that are produced by glassware machines and the like in a cyclic machine process. More particularly, the invention relates to a swab reject device that identifies and rejects articles produced in a particular mold during a particular cycle or cycles of operation after swabbing.

In the course of operating individual section (IS) glassware forming machines, it is necessary for the machine operator to periodically swab the blank molds and the blow molds at each side of the machine with a releasing agent to maintain the molds in proper working condition and prevent the molten glass from adhering to the molds during forming operations. The releasing agent is a liquid mixture of oil and carbon black that leaves a residue on the articles, such as glass bottles, that are formed in the mold during the machine cycle or cycles following swabbing. The residue is difficult to detect and remove from the bottles as described in U.S. Pat. No. 3,817,729 and, therefore, it is desirable to reject the affected bottles from the output of the forming machine.

A reject device for a glassware machine and the like is disclosed in U.S. Pat. No. 3,767,374 having the same assignee as the present invention. This prior art reject device is used for continuously rejecting articles from a particular mold of an IS machine and is not capable of discerning between articles formed in one cycle or another. The reject device is also incapable of rejecting a particular number of articles except through deliberate control of the reject device by the machine operator.

U.S. Pat. No. 4,004,904 issued to Fergusson discloses an electronic system for identifying articles from a multi-mold glassware forming machine for marking and subsequent separation. This electronic system utilizes a shift register that is clocked from a pulse generator running in synchronism with a lehr conveyor so that a time delay proportional to the rate of conveyance allows the marking or identification to occur at a predetermined time after formation of the rows of articles on the conveyor. However, this system is not capable of identifying articles formed during a particular cycle of the machine nor can the system limit the number of articles so identified except through control by the machine operator.

It is, accordingly, an object of the present invention to provide an apparatus that can identify an article formed in a particular mold during a particular cycle of operation after that article has been placed on an output conveyor of the machine.

SUMMARY OF THE INVENTION

The present invention resides in a ware forming machine, such as a glassware machine that produces bottles in a cyclic operation from a plurality of molds. Apparatus in the machine identifies an article produced in a particular mold during a particular machine cycle for rejection, marking or other purposes as the article translates along an output conveyor in a series of articles from the machine.

The identifying apparatus includes a plurality of manually actuated mold switches that are associated respectively with each of the plurality of molds in the machine sections. For example, if a machine section includes a blank mold and a blow mold, separate switches are provided for each. The switches are momentarily and selectively actuated by the machine operator to provide a ware signal indicative of an article produced from the associated mold during a particular cycle of operation when the switch is actuated.

Pulse generating means are operatively coupled with the ware forming machine and produce trains of pulse signals corresponding to the articles formed in the machine sections during each cycle of operation. The pulse generator can take a number of forms, and it generally includes a member driven at a rate proportional to the speed of the forming machine so that one pulse corresponds to one article produced by the machine.

In a multi-section ware forming machine, section signal generating means are operatively coupled with the machine to generate during each cycle of operation a sequence of section signals corresponding to the order in which articles from the section are arranged on the conveyor. The section signal generating means may rely in part upon pulses produced by the pulse generating means since there is a direct relationship between the number of sections and the number of articles represented by the pulses from the generator.

First gating means associated with each of the molds of the machine is connected between both the pulse generating means and the section signal generating means to generate coincidence pulses that indicate the presence of an article from the mold at a particular location on the conveyor.

Signal delay means are connected with the plurality of mold switches actuated by the machine operator to delay the switch signals for different numbers of machine cycles after the respective switches are actuated. The number of cycles of delay for the respective signals is correlated with the movement of the articles from their corresponding molds in a section to a given station along the conveyor.

Second gating means connected with the first gating means and the signal delay means receives the series of coincidence pulses as well as the delayed signal, and from these signals generates a further delayed signal as an article from a particular mold and a particular cycle reaches a given station along the conveyor.

Thus, a ware identifying signal produced by a machine operator after a swabbing operation at a particular mold is delayed during the period of time that is required for the article to be formed and moved to a given station on the output conveyor. The signal may then used to actuate an ejector, a marking device or other instrument cooperating with the article. The apparatus identifies only one or a particular number of articles and allows all other articles to pass the given station unless signals have been generated for their identification also. The apparatus additionally includes means for continuously identifying all articles from a particular mold in the event that the mold is malfunctioning.

DESCRIPTION OF THE PREFERRED EMBODIMENTS

Figure 1:
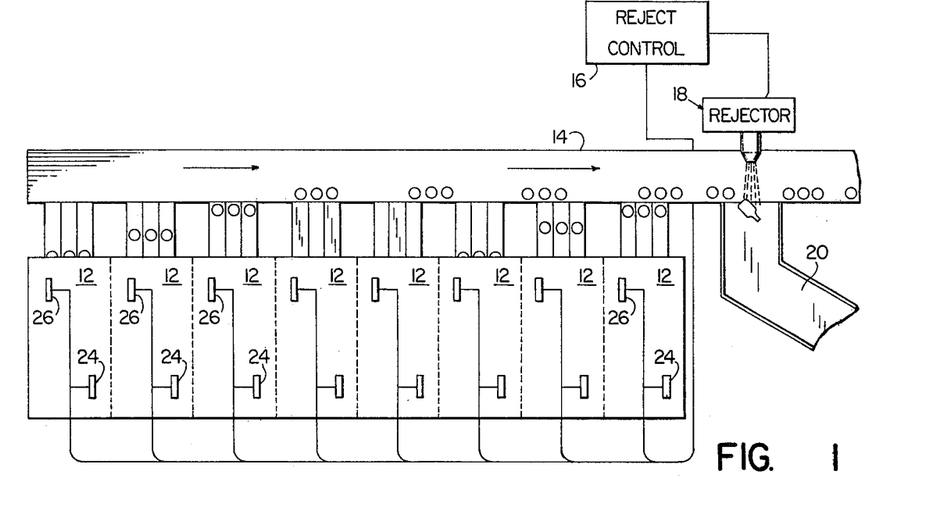
FIG. 1 is a plan view of an IS glassware forming machine having multiple sections depositing articles on an output conveyor that moves past a reject device.

FIG. 1 schematically illustrates an IS glassware forming machine, generally designated 10, or a like machine that produces a plurality of articles from corresponding parts of the machine in one cycle of operation, and continues production of such articles cycle after cycle. The illustrated machine has a plurality of triple gob sections 12, each of which produces three bottles in the course of a machine cycle and deposits those bottles in a series on an output conveyor 14. The sections are driven in synchronism with one another by means of a common timing mechanism such as a timing drum or time clock, and the sections operate in phased relationship with each other so that a gob distributor (not shown) above the machine can feed molten glass sequentially to each of the sections in a predetermined firing order.

The illustrated machine 10 has eight triple-gob sections and thus produces twenty-four bottles during each cycle of machine operation. The three bottles from each section are deposited as a group in the series on the conveyor 14. The sections 12 are identical in construction and insure that the bottles within each group have the same spacing. The velocity of the conveyor and the pusher mechanisms which deposit the bottles from each section on the conveyor are adjusted and timed so that the groups of bottles passing a given station downstream of the sections are evenly spaced.

The conveyor 14 translates the bottles in series past a reject station including a reject control 16 and a pneumatic rejector 18 and thereafter toward a lehr (not shown) for annealing the newly formed bottles. The rejector 18 is provided to remove from the conveyor bottles that are malformed for a number of reasons. For example, when the molds of the sections 12 are periodically swabbed with a releasing agent, a black residue is deposited on the bottles formed in the subsequent cycle or cycles of operation. The identifying apparatus of the present invention is used in the reject control 16 so that only the affected bottles are pushed from the conveyor 14 into a cullet chute 20 for reprocessing in subsequent cycles of the machine. The swab reject control 16 thusly identifies bottles formed by a particular mold during a particular cycle of operation and actuates the rejector at the appropriate instant to reject the bottle into the cullet chute 20. The control also has the capability of continuously rejecting articles from a mold which may be damaged, and can reject all articles which is customarily done during startup of the glassware machine.

A plurality of mold switches 24, 26 are provided in each section 12 to allow the machine operator to identify the particular mold swabbed and to send a reject signal corresponding to that mold to the reject control 16 immediately after swabbing. One set of mold switches 24 is provided on the blank side of the machine where parisons are formed from the molten glass, and another set of switches 26 is provided on the blow side of the machine where the parisons are blown to the final configuration of the bottles. Thus, the reject control 16 receives reject signals that discriminate between the blank mold side and the blow mold side in each machine section.

Additionally, each group of switches 24 or 26 includes the same number of switches as there are molds on the particular side of the machine. For example, with a triple gob machine, there are three blank molds in each section and three individual switches associated uniquely with each mold. Similarly, there are three individual switches associated uniquely with each blow mold. Signals from these switches are handled in a discriminating manner by the reject control 16 so that only the bottle produced by a particular mold during a particular cycle of operation is rejected into the cullet chute 20.

Figure 2:
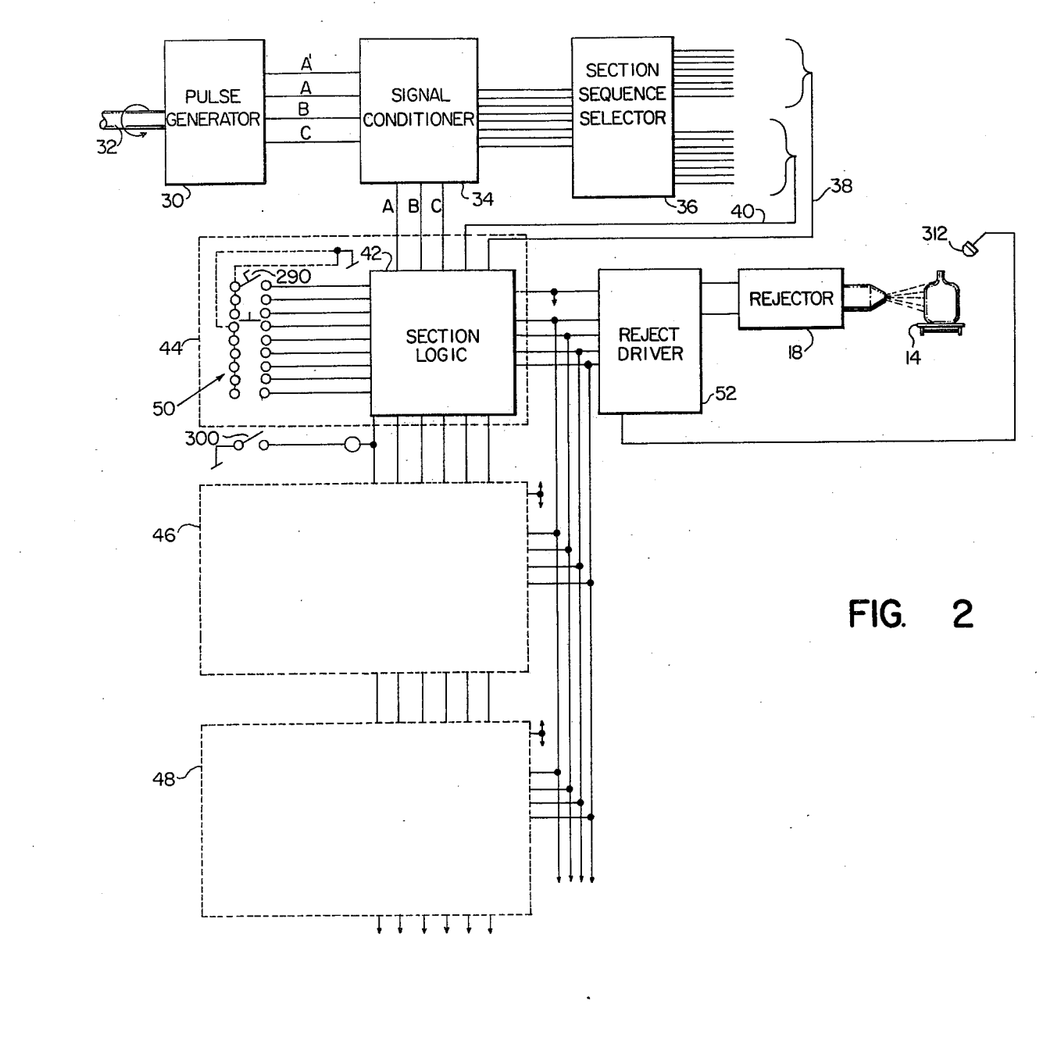
FIG. 2 is a block diagram illustrating the major components of the article identifying apparatus of the present invention in the reject control of FIG. 1.

FIG. 2 illustrates in a block diagram the general components that comprise the reject control 16 in FIG. 1. For purposes of explanation, it will be assumed that the control is designed to handle a triple gob machine having eight individual sections such as shown in FIG. 1; however, it should be understood that the control can be adjusted and utilized with single or multi-gob machines having fewer or more sections.

The basic signal source for the swab reject control is a pulse generator 30 which produces trains of pulses, each pulse corresponding to one bottle produced by the glassware forming machine. For this reason, the pulse generator is connected in operative relationship with the glass forming machine, and in one embodiment of the generator, the coupling between the generator and the machine is by means of a drive shaft 32 that is rotated in synchronism with the cycle of operation of the forming machine. Since the machine is a triple gob machine, the generator 30 produces three trains of pulses, A, B, C, and an additional pulse signal A' at a rate corresponding to the cyclic rate of the machine. Thus, each of the pulse trains A, B and C should include eight pulses during the period of the A' pulses.

All of the pulses are processed through a signal conditioner 34 which shapes the pulses as needed and additionally generates a sequence of section signals that are transmitted to a section sequence selector 36. The sequence selector produces two sets of sequenced section signals, one set on the lines 38 corresponding to the order of the ware from various sections on the conveyor 14, and the other set on lines 40 corresponding to the section firing order sequence. The lines 38 and 40 transmit the section signals to section logic circuits 42 in the various section controls 44, 46, 48, . . . one section control being provided for each individual section of the machine. In FIG. 2 only three such section controls are shown for the sake of convenience, and only the control 44 is shown in detail, each of the other controls having the same structure.

In addition to the sequenced section signals from the selector 36, the section controls 44, 46, 48, . . . each receive the pulse signals A, B, C from the signal conditioner 34. The pulse signals are utilized together with the section signals in gating circuits to generate signals associated with the bottles produced in each individual mold. The section controls also include a plurality of switches 50 that are comprised in part by the mold switches 24, 26 described above in connection with FIG. 1.

Each of the section controls 44, 46, 48, . . . produces a reject signal and transmits the signal through the reject driver 52 to the rejector 18 whenever one of the mold switches 24, 26 is momentarily actuated by the machine operator. The reject signal is a delayed signal that is initiated by a mold switch while a bottle is being formed in the mold but does not occur until later when the bottle passes in front of the rejector 18. The section controls can also be programmed to reject more than one bottle in the succession of bottles produced by a particular mold after the mold switch is actuated. Thus, for example, one, two, three or more bottles formed by a mold can be rejected automatically if a number of bottles are adversely affected by the swabbing operation. The reject controls also permit all bottles from a particular mold to be rejected continuously in the event that the mold is malfunctioning, and all bottles from every mold in every section can be rejected as is sometimes necessary when the forming machine is started up.

A more detailed explanation of the various components and different embodiments of the swab reject control follows.

Figure 3:
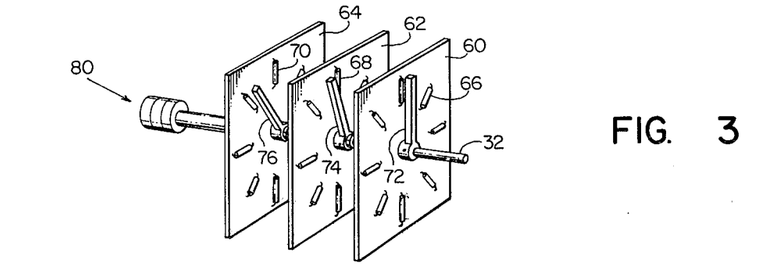
FIG. 3 is a perspective view of a pulse generator utilized in one embodiment of the invention.
Figure 4:
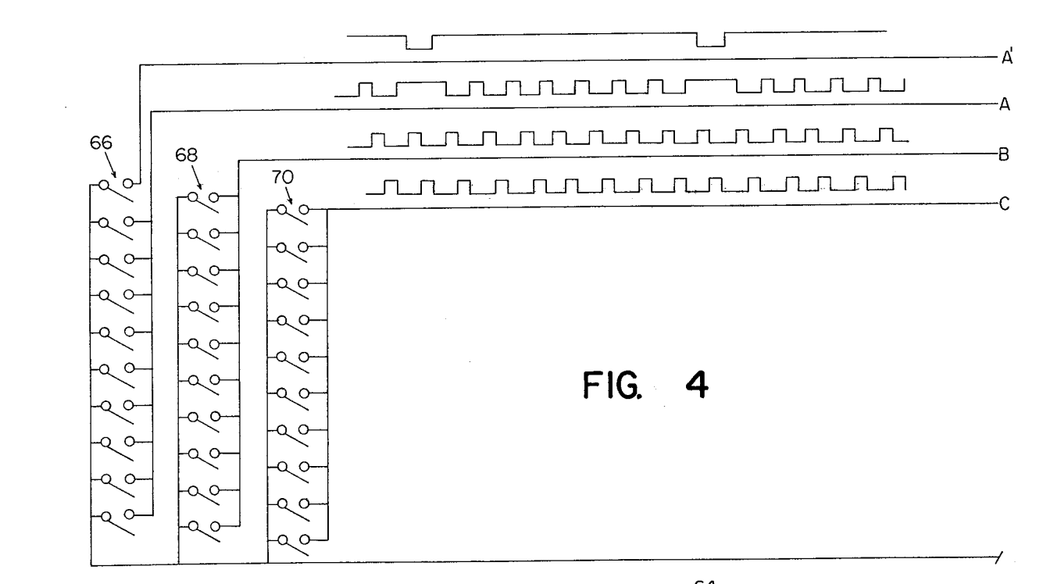
FIG. 4 is an electrical schematic of the pulse generator in FIG. 3, and illustrates the trains of pulses produced by the generator.

FIG. 3 illustrates one embodiment of the pulse generator 30, and FIG. 4 illustrates the trains of pulses that are produced by the generator. The generator in FIG. 3 is identical to the generator illustrated in U.S. Pat. No. 3,767,374 and is comprised by three circuitboards 60, 62, 64, each of which contains a plurality of magnetically sensitive proximity switches 66, 68, 70. The number of circuitboards corresponds to the number of mold sets in each section of the machine, and the number of proximity switches on each board corresponds to the number of sections in the machine. Thus, with a triple gob machine, there are three circuitboards, and with eight sections, there are eight switches on each board.

Three rotor arms 72, 74, 76 are mounted adjacent the respective circuitboards and carry magnetic slugs at their outer ends to actuate the various proximity switches. The rotor arms are mounted on the drive shaft 32 which is driven in synchronism with the machine operations as explained above in connection with FIGS. 1 and 2. As the shaft is rotated, the magnetic slugs actuate the various proximity switches 66, 68, 70, and the switches on each board are interconnected as shown in the electrical diagram of FIG. 4 to produce the illustrated trains of pulses A, B, C. It will be observed that due to the isolation of one of the switches 66 for the purpose of producing the A' pulse, the A train of pulses misses one pulse during each cycle of machine operation. Ideally each train of pulses should have the same number to correspond with each bottle produced by the various molds of the machine. The pulse missing from the A train in FIG. 4 is subsequently recovered in the signal conditioner 34 as described in greater detail below.

Because the bottles on the conveyor pass the rejector 18 in a single file with the bottles from one section of the machine in consecutive order, the pulses A, B, C illustrated in FIG. 4 have a phased relationship which corresponds to the arrival times of the bottles from one section in front of the rejector. The phasing of the pulses with respect to one another is achieved in the pulse generator of FIG. 3 by positioning the rotor arms 72-76 at different angular relationships with the array of proximity switches on the respective boards. Adjustment of the angular relationships for each of the arms is made by means of a phase adjuster 80 that consists of separate knobs 82 and 84 connected coaxial shafts to the rotor arms 74 and 76, the arm 72 being fixed to the drive shaft 32. Thus, separate adjustment of the rotor arms relative to one another adjusts the phasing of the A, B, C pulses relative to one another, and all of the pulses may be collectively adjusted relative to the arrival of the bottles at the rejector by adjusting the angular relationship of the printed circuitboards collectively relative to the drive shaft 32. By means of the various phase adjustments, each pulse in the pulse trains can be timed to occur at the instant when a bottle appears in front of the rejector 18, and if the rejector is actuated at that time, the bottle is ejected from the series on the conveyor.

Figure 5:
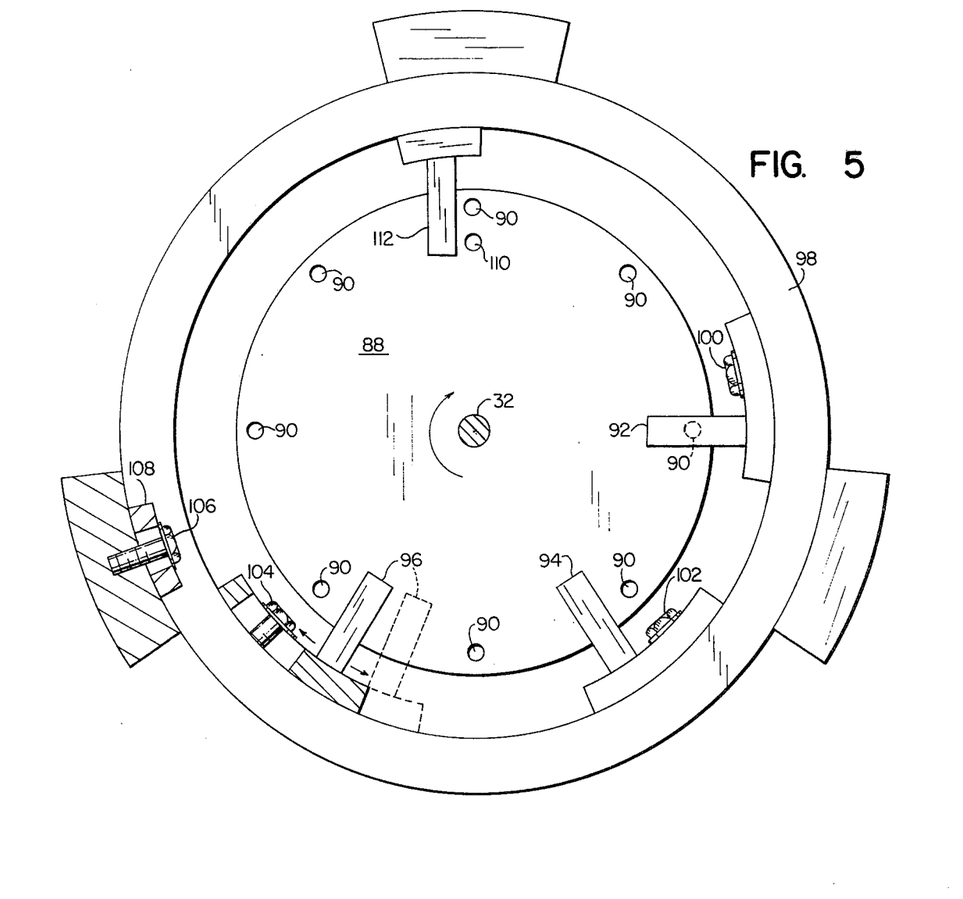
FIG. 5 is a schematic illustration of another pulse generator utilized in the present invention.

In another embodiment of the invention, the pulse generator may take a form illustrated in FIG. 5. In this embodiment a disc 88 is mounted on the drive shaft 32 and makes a full rotation with each cycle of the glassware machine. The disc has a plurality of detectible indicia 90 evenly distributed in a circular array about the shaft 32. Sensors 92, 94, 96 equal in number to the mold sets in each section are positioned adjacent the disc to detect the indicia and produce an output pulse as each sensor is passed by one of the indicia. For example, the indicia may be a plurality of holes or transparent areas in an opague disc, or conversely the disc may be transparent and the indicia may be opague, and the sensors 92, 94, 96 may be optical sensors sensitive to the light which is passed or blocked by the indicia.

The sensors 92, 94, 96 are mounted on an annular support ring 98 that is held in stationary relationship with respect to the rotating disc 88 by a clamping bolt 106 and lug 108. It will be observed that the sensors are mounted on the ring by means of clamping bolts 100, 102, 104 in slots of the sensor bases so that individual adjustment can be made in the circumferential positioning of each sensor as indicated by the arrows and phantom position of the sensor 96. In the positions shown relative to the evenly spaced indicia 90, the sensors produce substantially the same phasing of pulses illustrated in FIG. 4. Each of the indicia is equally spaced about the disc and when one of the indicia is aligned with sensor 92, the sensor 94 is located one third of the distance between two other indicia and the sensor 96 is located approximately two thirds of the distance toward still another indicia.

Collective adjustment of the sensors on the ring 98 relative to the rotatable disc 88 permits the pulse trains to be brought into synchronism with the arrival of bottles in front of the ejector mechanism and is accomplished by means of the clamping bolt 106 and a lug 108. The bolt 106 extends through a slot in the lug 108 into a housing or frame of the glassware machine to hold the ring 98 in the adjusted position.

In addition to the indicia 90, the rotatable disc 88 includes another indicia 110 located at a different radius from the shaft 32 than the indicia 90. An additional sensor 112 is mounted on the ring 98 to detect the indicia 110 once during each revolution of the disc 88. A pulse from the sensor 112 occurs once during each machine cycle assuming that the disc 88 rotates at the same cyclic rate as the machine, and the output of the sensor 112 is accordingly a pulse corresponding to the pulse A' shown in FIG. 4. The indicia 110 may be the same as or different from the indicia 90, and correspondingly, the sensor 112 may be the same as or different from the other sensors 92-96.

The pulse generator, in addition to using indicia detectable by light sensors, may use mechanical, magnetic, electrical and other types of indicia and corresponding sensors to produce pulse trains similar to those shown in FIG. 4.

Figures 6, 11:
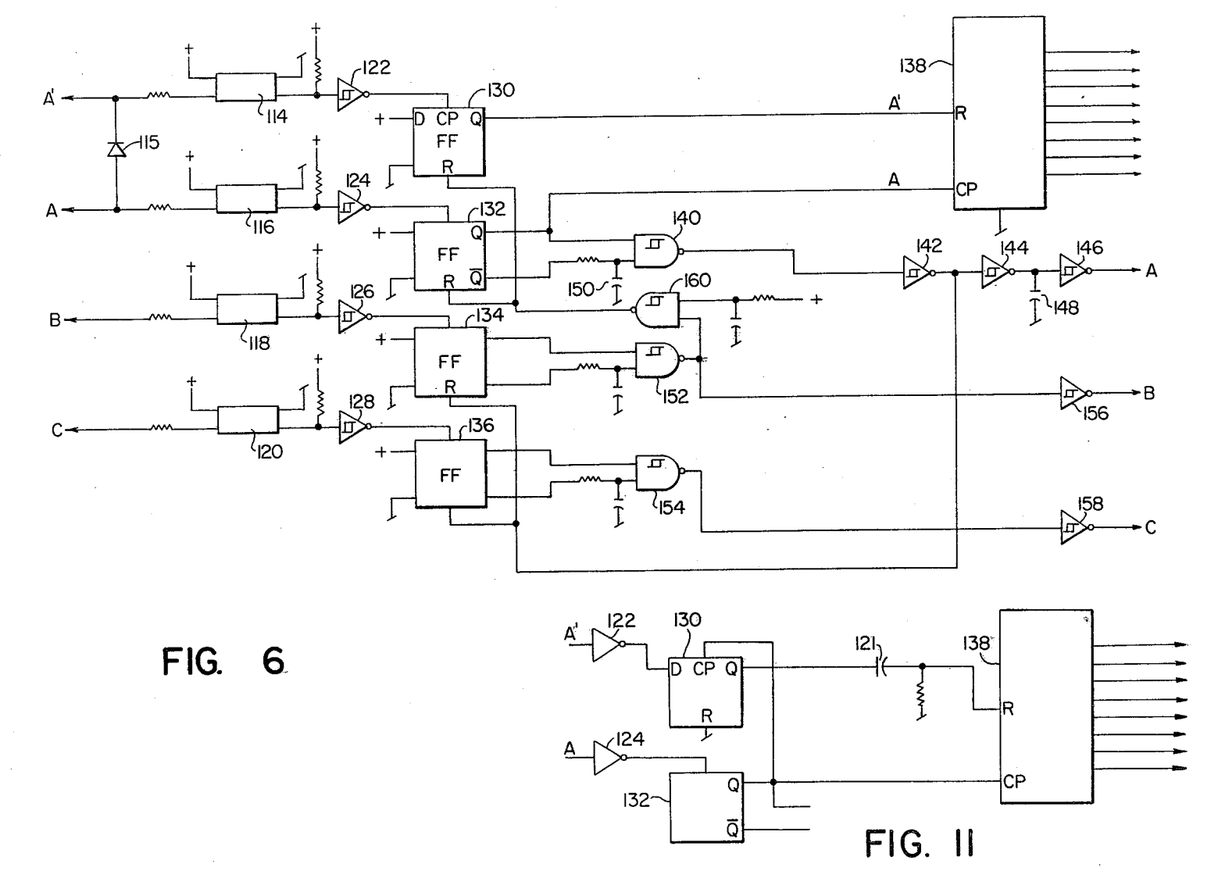
FIG. 6 is an electrical schematic showing the detailed structure of a signal conditioner utilized in the invention.
FIG. 11 is an electrical schematic showing an alternate clocking method for the section sequence counter.

Once the pulse trains are developed in synchronism with the arrival of the bottles in front of the rejector 18, the pulse trains are transmitted to the signal conditioner 34 which is shown in greater detail in FIG. 6. The pulse trains are fed respectively through optical couplers 114-120 and inverters 122-128 to D-type flipflops 130-136. As shown, the optical couplers 114-120 are gated by the "0" or low level signal of the pulse trains, and the output of the couplers is inverted to form a positive or high level clock pulse at the input to the flipflops. The A-pulse lost in the embodiment of the pulse generator illustrated in FIGS. 3 and 4 is recovered by the diode 115. The pulses are applied to the clock pulse (CP) inputs of the flipflops, and each of the data inputs (D) is connected to a positive or high voltage. The outputs of the flipflops are free of any chatter from the pulse generator.

The A-pulses are transmitted through the flipflop 132 to the clock pulse input of a counter 138 that has a plurality of outputs sequentially enabled or turned on as the A-pulses are received. The signals produced on the counter outputs represent a nondenominated, timed sequence of section signals that are generated once during each cycle of the glassware machine since the A-pulses during a single machine cycle are equal in number to the number of sections in the machine, and the A' pulse from flipflop 132 resets the counter once during each cycle. The section signals are employed in subsequent gating networks to discriminate between the groups of bottles on the conveyor and to generate the delays that occur between the time a bottle is formed in a section and the arrival of the bottle at the reject station along the conveyor 14.

If the A' pulse has a duration at least as long as the time required for two indicia to pass the sensor 92, for example, if the indicia 110 is an elongated arcuate slot or if the indicia and the sensor together produce a square wave having a period equal to the cycle time, then synchronism of the A-pulses and the sequenced section signals can be ensured without regard to the positioning of the sensors 92 and 112 by connecting sensor 112 to the data input of the D-type flipflop 130, and by connecting the Q output of flipflop 132 to the clock pulse input of the flipflop 130 as shown in FIG. 11. In this fashion the counter reset signal from the A' pulse is clocked by the A-pulse from the flipflop 132, and the counter is reset at the same time. Resetting of the flipflop 130 occurs with the next A-pulse after termination of the A' pulse; and to allow the counter to advance in the interim, an RC circuit 121 is provided which differentiates the reset signal.

The A-pulses are also transmitted through the flipflop 132 to a Schmitt trigger 140 and then pass through three inverters 142, 144, and 146. It will be observed that the RC circuit 150 connected with the Schmitt trigger 140 holds the output of the trigger circuit for a predetermined time so that the pulses transmitted to the inverters 142-146 are of uniform shape and magnitude. A capacitor 148 creates a small delay of the A-pulse relative to the A' pulses, but the delay is insignificant in comparison to the spacing of the bottles on the conveyor. The delay is desired in order to permit the section signals emanating from the counter 138 to precede the A-pulse in subsequent circuits of the reject control.

In a similar manner, the B-pulses and C-pulses are transmitted respectively through the flipflops 134, 136 and the Schmitt triggers 152 and 154 to the respective inverters 156 and 158 at the output of the signal conditioner. Another Schmitt trigger 160 is connected to the reset terminals of the flipflops 130 and 132 to set the flipflops in the $\overline{Q}$ state as the system is turned on and after each B-pulse. The flipflops 134 and 136 are reset by the A-pulse through a connection to the output of inverter 142.

Thus, the signals output by the signal conditioner 34 include the pulse trains A, B, C corresponding to all of the bottles arriving at the rejection station from the individual sections of the machine, and a sequence of section signals.

As shown in FIG. 2, the pulse trains A, B, C are transmitted to the section controls while the eight section signals from the conditioner are transmitted to the section sequence selector 36. The function of the sequence selector is to provide a flexible means for establishing two different sequences of phased section signals, one sequence corresponding to the order in which bottles from the various sections pass the rejection station, and the second sequence corresponding to the order in which the individual sections are fired. The first sequence, or ware order sequence, is utilized to enable the appropriate logic circuitry for a given section when the bottles of that section pass the rejector. The other sequence corresponding to the firing order of the sections is utilized to clock a shift register which delays reject time signals for a particular number of cycles approximating the time required for a bottle to move from a mold through the machine and along the conveyor to the rejection station.

Figure 7:
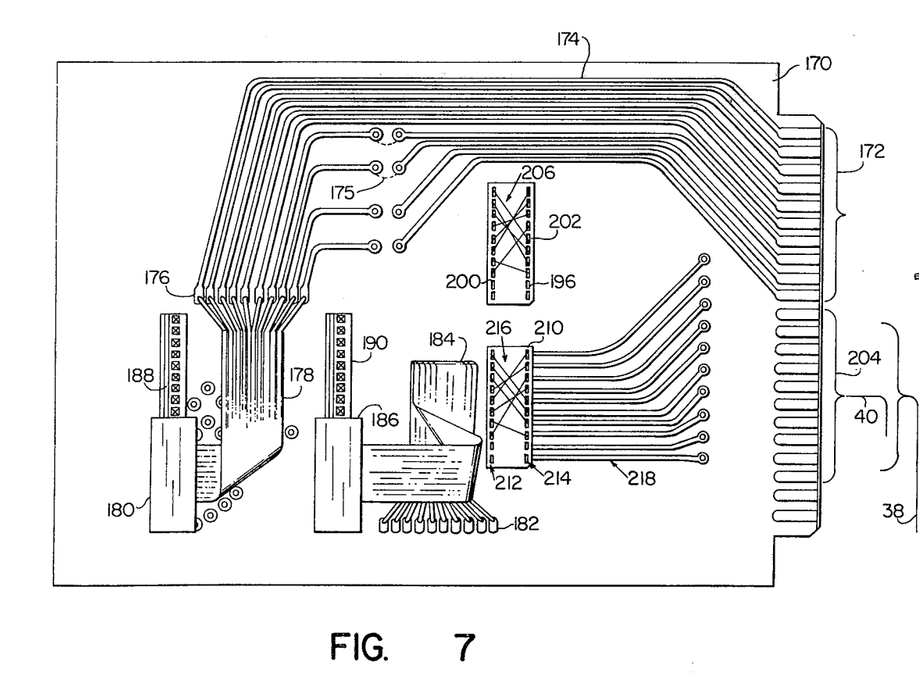
FIG. 7 is a plan view of a circuit board forming the sequence selector in the present invention.

In FIG. 7 showing the sequence selector 36 the nondenominated section signals produced by the signal conditioner 34 are received on a circuitboard 170 at the respective terminals 172 and are transmitted on the board through conductors 174 to a plurality of terminals connected with the leads of a ribbon wire 178 and associated plug 180. Several of the conductors 174 include terminals and associated jumpers 175 to equate the number of complete conductors with the number of sections in the glassware machine. For example, two jumpers 175 are shown by dotted lines to provide a total of eight complete conductors between the terminals 172 and 176 in accordance with the eight sections illustrated in the machine of FIG. 1.

The terminals 176 are also connected through conductors on the opposite side of the circuitboard (not visible) with terminals 182 and the leads of another ribbon wire 184 and associated plug 186.

Figure 8:
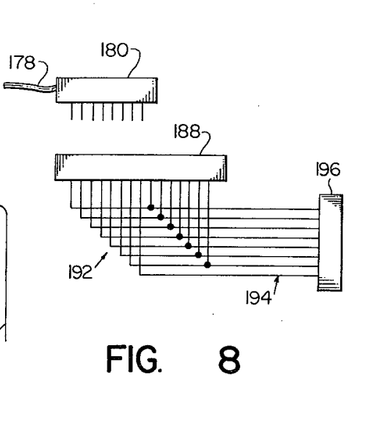
FIG. 8 is a schematic drawing of the coarse phase adjusters utilized in the sequence selector of FIG. 7.

The plugs 180 and 186 and their cooperating connectors 188 and 190 on the circuitboard constitute parts of coarse phase adjustors for the nondenominated section signals received by the terminals 172. FIG. 8 illustrates the complete phase adjuster including the plug 180 and connector 188. The plug 180 has a plurality of equally spaced pins that mate with another plurality of pin contacts of the connector 188 in various combinations. The contacts within the connector 188 have output terminals connected through a series of jumpers 192 and conductors 194 to the input terminals of a patchboard 196. Since the pins in the plug 180 have the same spacing as the contacts in the connector 188, the plug 180 can be placed in a plurality of positions in the plug, and indexing the plug from one position to the next changes the order of the transmitted signals appearing at the terminals of the patchboard 196. The number of pins and contacts is selected so that one terminal on the patchboard can receive any one of the various signals carried by the plug 180. In other words, if there are n pins in the plug 180, then the connector 188 has 2n-1 contacts and output terminals connected respectively with n terminals on the patchboard 196. With section signals phased throughout the full cycle of the glassware machine, each indexing step of the plug shifts the phase of the section signals on the patchboard by 1/n of the machine cycle. In the present case, with eight sections, each indexing step of the plug produces a 45° shift in the section signals at the patchboard 196.

The patchboard 196 as shown in FIG. 7 includes a set of input terminals 200 that are connected respectively by conductors not shown with the phased outputs of the connector 188 as described above and a corresponding set of output terminals 202 that are connected by means of conductors (not shown) with the terminals 204 along the edge of the board 170. A series of patch conductors 206 extend between the terminals 200 and 202 in an array that corresponds to the order in which the bottles from the sections 112 pass the rejection station. It will be understood that this order of the bottles from the sections, that is the ware order, does not normally correspond to the order in which the sections are fired or positioned along the conveyor, and instead, depends upon a number of factors including the distance of a section from the machine, the firing order of the sections, the speed of the conveyor, the direction of delivery of the conveyor, the spacing of the bottles on the conveyor and the timing of the pusher assemblies that move the bottles from the machine onto the conveyor. The patchboard 196 is accordingly programmed by connecting the patch conductors 206 between the input terminals in a manner that correlates the phased section signals with the ware order.

The sequenced section signals from the phase adjuster formed by plug 186 and 190 are transmitted to another patchboard 210 by means of conductors not shown on the opposite side of the board 170, and the patchboard 210, like the patch board 196, has a set of input terminals 212 and output terminals 214 that are interconnected by means of another set of patch conductors 216. The conductors 216 are attached to the terminals 212 and 214 so that the phased section signals at the output terminals 14 occur in the order in which the various machine sections are fired. Since the order in which the ware passes the inspection station is not the same as the order in which the sections are fired, two separate patchboards 196 and 210 are required to produce the two different sets of sequenced section signals. The output terminals 214 of the patchboard 210 are connected through conductors 218 to a set of edge terminals on the opposite side of the printed circuitboard 170 from the terminals 204.

Thus, the printed circuitboard 170 containing the components defining the sequence selector 36 receives one set of sequenced section signals and produces two other sets of phased sequenced section signals. The set of section signals corresponding to the ware order are transmitted on lines 38 to the various section controls 44, 46, . . . in FIG. 2 and the set of section signals corresponding to the firing order are transmitted on lines 40 for purposes described in detail below.

Referring briefly to FIG. 2, it reveals that the A, B, C pulses which occur in synchronism with the arrival of each bottle in front of rejector 18 and the phased section signals on line 38 representing the ware order provide sufficient information to uniquely identify each bottle passing in front of the rejector by mold sets and section. The section controls 44, 46, . . . gate the signals together to provide signals unique to the bottles from a mold set and then add appropriate delays based on the firing order section signals from line 40 to determine precisely when a bottle from a particular cycle of the machine reaches the rejector. If one of the reject switches 50 has been acutated for that particular mold, then the section logic 42 for the particular section signals the reject driver 52 to actuate the rejector and remove that bottle from the conveyor.

Figure 9:
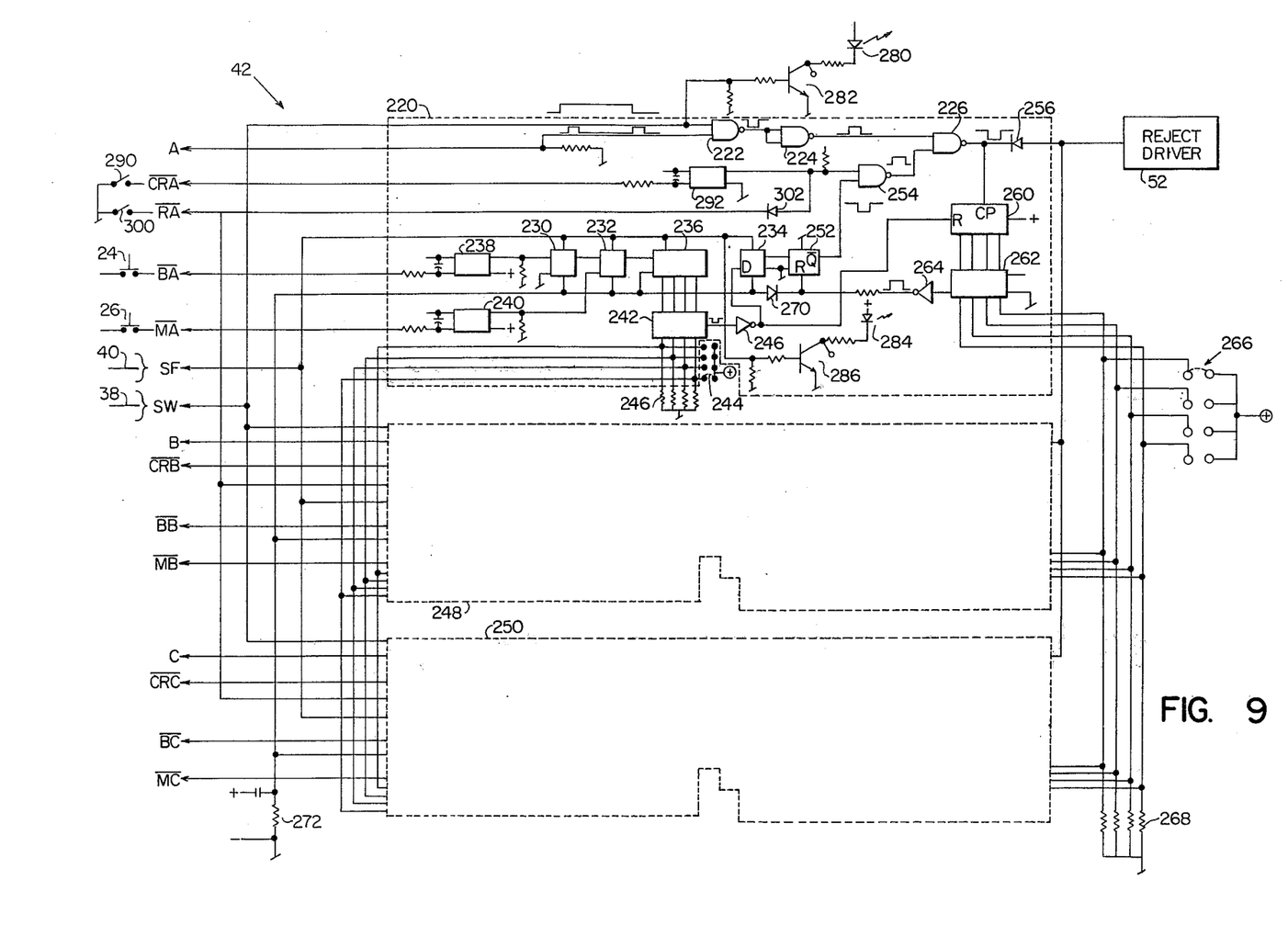
FIG. 9 is a detailed electrical schematic illustrating the section logic control for one section of a triple gob IS forming machine.

FIG. 9 illustrates the detailed circuitry that is included in each section logic circuit 42. Such circuitry is provided for each of the individual machine sections so that an eight-section machine would have eight such logic circuits.

It will be observed in FIG. 9 that the A pulses from the pulse generator 30 are applied to a subsection 220 illustrated in detail, and the B and C pulses are applied to similar subsections 248 and 250 respectively which are merely outlined. Thus, the logic circuits for each section are comprised by subsections equal in number to the number of bottles produced by each section in a single cycle of machine operation. In the following discussion only the processing of the A pulse and other associated signals is described, the processing of the B and C pulses being the same in the other subsections 248 and 250.

The A pulses are applied to a NAND gate 222 in conjunction with one of the section ware order signals SW that is peculiar to the section and bottles from the section that are passing in front of the rejector during the particular phase of the machine cycle. Upon coincidence of the ware order signal and the A pulse, the NAND gate 222 generates a corresponding pulse that is inverted by NAND gate 224 and applied to a further NAND gate 226. The other signal applied to NAND gate 226 is a delayed timing pulse, the delay being equivalent to the time required for an article to move from a mold in the section under consideration to the rejection station. Thus, the NAND gate 226 produces a reject pulse that actuates the rejector 18 in FIG. 1 at the precise moment when a bottle from the section passes in front of the rejector nozzle. Generation of the delay signal is described below.

The delayed timing pulse applied to gate 226 is generated by means of a data shifting means comprised by D-type flip-flops 230, 232, 234 and a four stage shift register 236. The clock pulses for shifting data are derived from one of the sequenced section signals SF which track the firing order of the sections, the particular signal being peculiar to the section under consideration so that shifting occurs at a particular time during the section cycle when data entries will not be made in the unbuffered flipflops. That time may be the time during which a parison is being removed from the blank mold and transferred to the blow mold.

The data entered and shifted is the reject signal derived from the mold switches 24, 26 manually actuated by the machine operator after swabbing. If he swabs a blank mold, then a blank mold reject signal BA from a switch 24 is applied through an optical coupler 238 to set the flipflop 230. If he swabs a blow mold, then a blow mold reject signal MA from a switch 26 is applied through an optical coupler 240 to set the flipflop 232. The data input of flipflop 230 is grounded so that the clock pulse which is first received after the switch 24 is closed resets the flipflop in preparation for a subsequent reject signal. At the same time, the data input of flipflop 232 connected to the flipflop 230 shifts the reject signal from flipflop 230 to the data input of shift register 236. The set terminal of flipflop 232 is connected to the coupler 240 so that a clock pulse shifts data (a blow mold reject signal MA) directly into the first stage of shift register 236 and resets the flipflop 232 provided that a blank mold reject signal BA has not been set in flipflop 230. The delay of the blank mold signal BA through the flipflops 230 and 232 and the shift register 236 is one clock pulse or machine cycle longer than the delay of the blow mold signal MA because the time required for a blank mold parison to reach the reject station is one machine cycle longer than the time required for the bottle from the blow mold. Accordingly, the mold switches and delay circuits discriminate between blank mold and blow molds and enable the first affected bottle through the section after swabbing to be identified.

The shift register 236 has four stages with outputs that are coupled respectively with a four-bit coincidence selector 242. The selector is programmed to recognize shifted data in one of the stages of the register 236 by means of a jumper 244 that sets a mating stage of the selector at a high level. Accordingly, by appropriate programming of the selector 242, a data bit can be delayed in the shift register 236 up to four clock pulses before the selector transmits a pulse through the inverter 246 to the flipflop 234. The selector enables a time delay for a particular section of the machine to be programmed in accordance with the distance of that section along the conveyor from the reject station. The delay is metered in terms of section cycles which accommodates any particular speed of the machine and provides at least a coarse measurement of the time required for a bottle to move from a mold along the conveyor to the reject station.

It will be understood that the programming of the selector 242 by means of the jumpers 244 places a "1" or high level voltage on the input terminals connected respectively to the resistors 246. Since the delay period from the section to the reject station is substantially the same for all bottles produced in a given machine section, the programming signal established by the jumper 244 is applied to the selectors in the other two subsections 248 and 250 as indicated by the interconnecting leads.

The delayed reject signal produced by the flipflop 234 sets a flipflop 252 and produces a binary "0" or low level signal on one input of a NAND gate 254. The flipflop 252 and NAND gate 254 thus enable gate 226 so that each timed ware signal from the gate 222 is inverted and transmitted through the diode 256 to the reject driver 52, and corresponding bottles are rejected.

A counter 260 and another coincidence selector 262 similar to the selector 242 are provided to reject a predetermined number of bottles that are produced in succession by the particular mold immediately after swabbing. Thus, it is possible to reject not only the bottle that is produced in the cycle immediately following the swabbing, but a limited series of bottles from that mold. The delayed reject pulse from the inverter 246 sets the counter 260 in preparation for counting of the number of bottles to be rejected. The reject pulses produced by the gate 226 are supplied to the counter 260 as clocking pulses. Each of the output stages of the counter 260 is connected with a corresponding stage of the selector 262, and when a count on one of the outputs coincides with a binary "1" or high level voltage in one of the stages of the selector programmed by a jumper 266 and resistors 268, the selector produces a reset signal that is transmitted through the inverter 264. The reset signal from inverter 264 is applied to the flipflop 252 which terminates the enabling signal to gates 254 and 226 and the transmission of any further reject pulses to the driver 52.

The diode 270 prevents the reset signals generated by the selector 262 from reaching the other stages of the data shifting means, but permits voltage signals from the RC network 272 to reset the flipflops and registers during power-up operations.

An LED 280 is turned on in a cyclic manner by a transistor 282 and the ware signal SW during the intervals in which ware from the particular section in question is passing in front of the reject station. The LED enables maintenance functions to be carried out with greater facility.

Another LED 284 is actuated through a transistor 286 in synchronism with the firing of the section under consideration. The transistor 286 is rendered conductive by means of the firing order signal SF which clocks the data shifting means.

The individual section controls 44, 46, 48, . . . and the section logic circuitry also have provisions for rejecting bottles from a particular mold on a continuous basis. For example, if either a blank or blow mold is not operating properly and is producing bottles which are not satisfactory, all bottles produced by either the blank or the blow mold can be rejected. The device described in U.S. Pat. No. 3,767,374 serves the same function.

For the continuous reject function, a single pole, single throw switch 290 associated with one set of blank and blow molds is provided at the machine section to generate a continuous reject signal CRA when the switch is closed. The continuous signal is transmitted through a coupler 292 to the NAND gate 254. Similar switches are provided for the other sets of molds within the section. The continuous signal enables gate 226 to transmit every clocked ware signal received from the coincidence gate 222, and the reject driver 52 then actuates the rejector 18 each time a bottle from the one blank or blow mold passes the reject station.

During start-up operations, it is sometimes desirable to reject all bottles from all of the molds until the machine and molds have reached operating temperature and conditions. For this purpose, one single pole-single throw switch 300 is provided for all of the molds in the individual sections of the machine and a reject-all signal RA is transmitted from the switch through isolation diodes, such as diode 302, to all of the logic circuits for all sections. The gates 254 and 226 are enabled and all ware pulses for all sections are individually passed to the reject driver 52 in substantially the same manner as the continuous reject signals for the individual sets of molds in each section.

Figure 10:
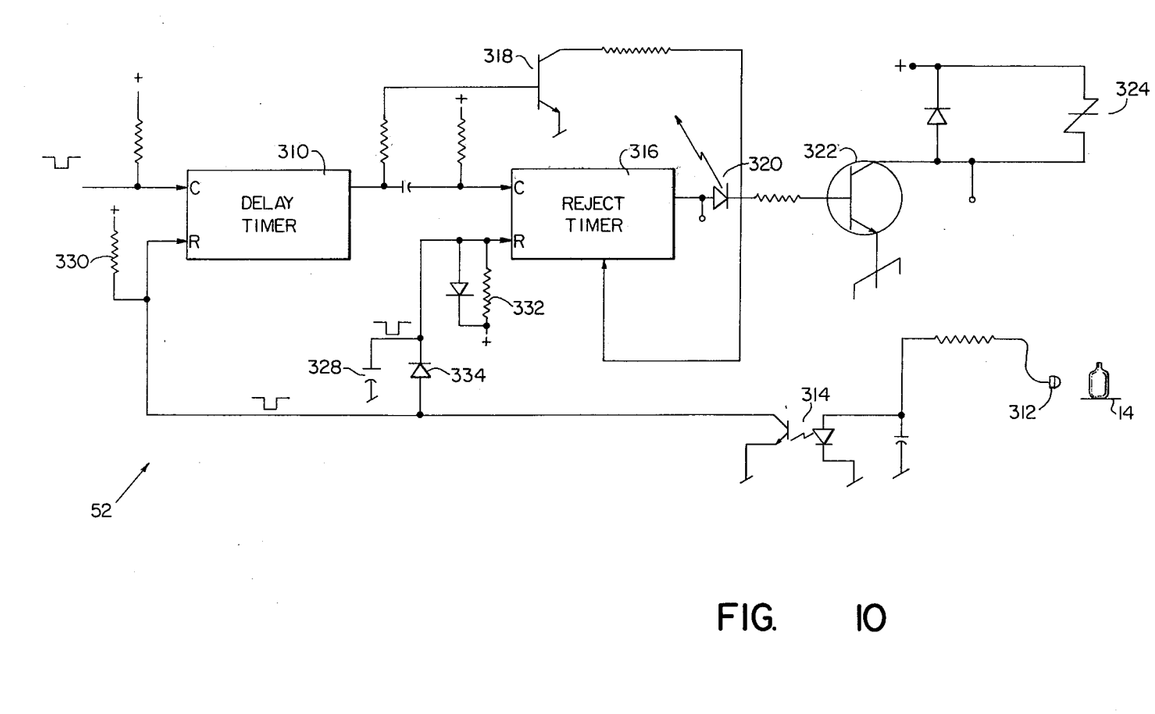
FIG. 10 is an electrical schematic illustrating the reject drive in FIG. 1.

The circuitry of the reject driver 52 is illustrated in detail in FIG. 10. Reject pulses from the section logic circuits of each individual section are received by a delay timer 310. The delay timer is provided to enable fine adjustments of the timing of the reject pulses to be made so that a bottle is in position in front of the nozzle.

In the event that a bottle is not accurately located on the conveyor, a photodetector 312 is positioned adjacent the conveyor to sense the actual position of the bottle as it reaches the rejector. If a signal is transmitted from the detector through an optical coupler 314 before the delay timer 310 runs out, the timer is reset and an actuation signal is immediately produced without waiting for the timed delay period to run out.

The actuating signal from the timer 310 is transmitted to a reject timer 316 which sets the interval of time during which the pneumatic rejector 18 is turned on. Since the bottles are positioned close to one another in sequence on the conveyor, the rejector can only be turned on for a brief period of time which is metered by the timer 316. Otherwise, bottles leading or following the identified bottle could be blown off of the conveyor into the cullet chute.

When the control is initially turned on, a capacitor 328 holds the reset terminal of the timers 310 and 316 at a low level to zero the timers. The terminals are subsequently set at a high level for timing through resistors 330 and 332. The diode 334 prevents the low level signal from the optical coupler 314 from interfering with the dwell period of the reject timer 316.

In the event that two consecutive bottles are to be rejected from the conveyor 14, it is possible that the second actuating signal from the delay timer 310 may occur before the period of the reject timer 316 has run out for the first bottle. In this event, a transistor responding to the second actuating signal from the timer 310 grounds a timing capacitor in the reject timer and restarts the dwell period for the next bottle.

The actuating pulse produced by the reject timer 316 is transmitted through an indicating LED 320 to a power transistor 322 and actuates a solenoid valve 324 for the pneumatic rejector.

Accordingly, a reject apparatus has been disclosed that is capable of identifying a bottle that is formed in a particular mold of a multi-section glassware forming machine during a particular cycle of operation. The identification is delayed until after the bottle is passed through the machine and been moved along an output conveyor to a rejection or other station.

While the present invention has been described in a preferred embodiment, it should be understood that numerous modifications and substitutions can be made without departing from the spirit of the invention. For example, pulse generators other than the generators illustrated and disclosed in this application can be employed to produce the timing signals. A master clock controlling the entire sequence of operations in the glassware machine may be the source of the timing signals for the reject apparatus as well. The specific circuits illustrated for shaping, sequencing and controlling the reject apparatus may be varied, and mechanical, electrical and other rejectors may be substituted for the pneumatic rejector described. Accordingly, the present invention has been described in a preferred embodiment by way of illustration rather than limitation.

I claim:

1. In a ware forming machine having multiple sections producing a plurality of articles such as glass bottles or the like from a plurality of molds during each cycle of machine operation, all of the sections depositing the articles in series on an output conveyor, a ware identifying apparatus for selectively identifying in the series on the conveyor, articles formed in a particular section and mold during a particular cycle of the machine operation comprising:

a plurality of mold switches associated respectively with each of the plurality of molds in each section, each switch being selectively actuated to provide a ware signal indicative of an article produced from the associated mold during a particular cycle of operation;

pulse generating means operatively coupled with the ware forming machine and producing trains of pulse signals corresponding to the articles formed in the machine sections during multiple cycles of the machine operation;

section signal generating means operatively coupled with the ware forming machine for generating during each cycle of machine operation a sequence of section signals corresponding to the order of the articles from the sections on the conveyor;

first gating means associated with each of the molds of the machine and connected with both the pulse generating means and the section signal generating means for detecting a coincidence of the pulse signals and the sequenced section signals and generating a series of coincidence pulses for each series of articles from the molds of the respective sections;

signal delay means connected with the plurality of mold switches to receive the ware signals from the switches and produce signals delayed for different numbers of machine cycles after the respective switches are actuated, the number of cycles of delay for the respective signals corresponding with the movement of an article from the corresponding mold in a section to a given station along the conveyor; and second gating means connected with the first gating means and the signal dealy means to receive the series of coincidence pulses and the delayed signals to generate a unique signal identifying an article produced in a particular mold during a particular cycle of operation at a time when the article reaches the given station along the conveyor.

2. In a ware forming machine, the ware identifying apparatus as defined in claim 1 further including processing means positioned at the given station along the conveyor and connected to the second gating means for operating upon the identified article in response to the unique signal.

3. In a ware forming machine, the identifying apparatus as defined in claim 2 wherein the processing means comprises rejector means for removing the identified article from the conveyor.

4. In a ware forming machine, a ware identifying apparatus for selectively identifying articles as defined in claim 1 wherein:

the machine includes a plurality of molds in each machine section, and the plurality of mold switches comprises in each section a plurality of switches equal in number to the number of molds in the section, each switch being uniquely associated with one mold in the section.

5. In a ware forming machine, a ware identifying apparatus for selectively identifying articles as defined in claim 4 wherein:

each machine section includes a blank mold in which a parison is formed during one cycle of operation and a blow mold to which the parison is transferred and blown to the form of the article during the next cycle of operation; and the signal delay means connected with the mold switches includes means for producing signals associated with the blank molds that are delayed one more cycle than signals associated with the corresponding blow molds.

6. In a ware forming machine, a ware identifying apparatus as defined in claim 1 wherein: the pulse generating means is adjustably phased with the movement of the articles along the conveyor to generate a pulse in a train at the same time that an article reaches the given station along the conveyor.

7. In a ware forming machine, the ware identifying apparatus as defined in claim 1 wherein the pulse generating means comprises a plurality of switches for each of the molds in the forming machine and actuating means coupled with the forming machine for actuating each of the switches in synchronism with the cycle of machine operation to produce trains of pulses, each train being associated with a particular mold.

8. In a ware forming machine, the ware identifying apparatus as defined in claim 1 wherein each section of the machine has the same number of molds; and the pulse generating means comprises a rotatable member driven in sychronism with the machine cycles and having detectable indicia arranged in a circular array on the member, and sensing means mounted adjacent the member for detecting the indicia as the member rotates to produce the trains of pulses in response to the indicia.

9. The ware identifying apparatus as defined in claim 8 wherein the rotatable member and the sensing means in the pulse generating means are matched with the sections of the forming machine to produce at least one pulse for each machine section in one revolution of the rotatable member.

10. The ware identifying apparatus as defined in claim 8 wherein the rotatable member of the pulse generating means has separately detectable indicia for each section of the forming machine.

11. The ware identifying apparatus of claim 10 wherein the sensing means of the pulse generating means has the same number of sensors positioned adjacent the rotatable member as molds in each section.

12. A reject apparatus for rejecting selected articles from a glassware forming machine or the like which machine has multiple sections and a uniform number of molds in each section producing articles in a cyclic machine operation and transfers the articles from each section to a common rejection station, comprising:

a plurality of manually actuated switches, each switch being uniquely associated with one mold in a section of the machine to produce a corresponding rejection signal identifying an article to be rejected, the article being formed in the associated mold during a particular cycle of the machine;

article signal generating means common to all of the molds in all machine sections and connected with the forming machine for producing timing signals in timed relationship with the arrival of articles from each section at the common rejection station;

rejection signal delaying means connected with the forming machine and the plurality of manually actuated switches delaying the respective rejection signals from the switches for periods of time allowing the articles to travel from the molds to the rejection station;

gating means connected with the article signal generating means and the rejection signal delaying means for correlating the timing signals for all machine sections and the delayed rejection signals from the switches in particular sections and producing timed rejection signals for articles formed in particular molds and sections during particular cycles of the machine; and rejection means at the rejection station connected with the gating means to receive the timed rejection signal and reject an article formed in a mold during a particular cycle when the article reaches the rejection station.

13. A reject apparatus for rejecting selected articles from a glassware forming machine or the like as defined in claim 12 wherein the article signal generating means comprises a pulse generator producing pulses corresponding to the arrival of articles at the rejection station from the respective molds of all machine sections, section sequencing means producing a sequence of timed signals corresponding to the order of arrival of all articles from the various sections at the rejection station, and gating means connected to both the pulse generator and the section sequencing means for combining the pulses and timed signals.

14. A reject apparatus for rejecting selected articles as defined in claim 12 wherein:

the rejection signal delaying means includes a sequencer producing signals in a sequence corresponding to the order in which the sections of the machine are operated in the machine cycle; and a plurality of delay circuits associated with the molds of each section are connected to the sequencer and establish delay times corresponding to the periods of time required for articles to travel from the respective sections to the rejection station.

15. A reject apparatus for rejecting selected articles as defined in claim 14 wherein:

the sequencer produces a sequence of section signals in the order of operation of the sections in the machine cycle; and each of the delay circuits connected to the sequencer responds to one of the section signals to determine the period of delay.

16. A reject apparatus for rejecting articles as defined in claim 15 wherein each of the delay circuits comprises data shifting means clocked by one of the section signals from the sequencer.

17. A reject apparatus for a glassware machine as defined in claim 16 wherein:

each data shifting means of the delay means has multiple stages between which data is transferred in succession;

each section of the machine has a blank mold and cooperating blow mold; and the plurality of manually actuated switches includes a first set of switches for the blank molds and a second set of switches for the blow molds; the manually actuated switches of the first set being connected respectively with one of the stages in the data shifting means, and the manually actuated switches of the second set being connected respectively to the next stages in shifting order.

18. A reject apparatus as defined in claim 16 wherein the sequencer includes phasing means for clocking each of the delay circuits at a particular time during operation of the sections.

19. A reject apparatus for rejecting selected articles as defined in claim 12 further including means for selectively rejecting a particular number of articles greater than one from a particular mold in sequence.

20. A reject apparatus for rejecting selected articles from a ware forming machine or the like as defined in claim 12 wherein:

the plurality of manually actuated switches are non-latching switches providing single reject signals for a given mold; and another plurality of manually actuated switches are included to provide continuous reject signals for a given mold.

21. A reject apparatus for rejecting selected articles from a glassware forming machine or the like as defined in claim 12 wherein the article signal generating means includes a pulse generator producing pulses for each article formed by the machine sections, the generator being connected in driving relationship with the forming machine for operation in synchronism with the machine, and having a rotatably driven member and a plurality of sensors actuated by the driven member to produce the pulses for each article.

22. A reject apparatus for rejecting selected articles as defined in claim 21 wherein the pulse generator further includes a pulse counter for counting the generator pulses and producing a sequence of section signals during each cycle of the machine.

23. A reject apparatus as defined in claim 22 wherein the article signal generating means includes phasing means for synchronizing the production of the sequence of section signals with the arrival of the articles from the respective sections at the rejection station.

24. In a glassware forming machine or the like having an interconnected group of individual sections operated in phased relationship with each other in a machine cycle, each section having an interconnected group of blank and blow molds, an improved pulse generator producing pulses for each article made by the sections comprising:

a rotary member connected with and driven by the forming machine, and having a plurality of detectable indicia associated with the one of the interconnected groups and distributed in a circular array about the member;

an adjustable support positioned in the forming machine adjacent the rotary member and being rotatably adjustable relative to the rotary member; and a plurality of sensors associated with the other of the interconnected groups and mounted on the adjustable support adjacent the rotary member to detect each of the indicia individually and produce an output signal as the indicia rotate with the member relative to the sensors, each sensor being mounted on the support for individual adjustment relative to the other sensors whereby the timing of the output signals from the sensors can be individually adjusted by movement of a sensor or collectively adjusted by movement of the support.

25. An improved pulse generator as defined in claim 24 wherein the indicia on the rotatable member have defined arcuate limits in the circular array, and the sensors produce an output signal in the form of a pulse for each detected indicia.

26. An improved pulse generator as defined in claim 24 wherein the indicia on the rotatable member are defined by transparent and opague areas in a circular array, and the sensors are optical sensors detecting the transparent and opague areas.

27. An improved pulse generator as defined in claim 24 wherein:

the rotatable member further includes a single detectable indicia at a radius of the member different from the circular array of indicia; and another sensor is mounted adjacent the rotatable member for detecting the single indicia.

28. An improved pulse generator as defined in claim 24 wherein:

the indicia on the rotatable member are equal in number to the number of individual sections of the forming machine and are equally spaced in the circular array; and the sensors are equal in number to the gobs handled by each section and are positioned to phase the pulses with the articles output from each section.

29. An improved pulse generator as defined in claim 28 further including a digital counter having a number of output stages equal to at least the number of sections in the forming machine and a clock pulse input connected to one of the sensors to produce signals unique to the operations of each section.

30. An improved pulse generator as defined in claim 29 wherein:

the rotary member is driven by the forming machine at the rate of one revolution per machine cycle;

a cycle sensor is provided to produce a cycle signal once during each revolution of the rotary member; and the digital counter has a reset terminal for resetting the count of the counter to a starting count, and the reset terminal is connected with the cycle sensor for resetting once during each cycle of the machine.

31. An improved pulse generator as defined in claim 30 wherein:

the cycle sensor produces a cycle signal having a duration at least as long as the time required for two adjacent indicia on the rotary member to move past a sensor; and a clocked flipflop is interposed between the cycle sensor and the reset terminal of the counter and has a data input connected to receive the cycle signal, and a clock pulse input connected to one of the other sensors of the indicia to synchronize the output signals of the sensors and the resetting of the count.

32. An improved pulse generator as defined in claim 28 wherein the sensors are positioned in spaced relationship about the rotary member, the spacing between the respective sensors being greater than the spacing between the equally spaced indicia in the circular array.

* * * * *